United States Patent
Takeshita et al.

(10) Patent No.: US 10,253,156 B2
(45) Date of Patent: Apr. 9, 2019

(54) PROCESS FOR PRODUCING DISPERSION OF FINE INORGANIC PARTICLES, CURABLE COMPOSITION CONTAINING SAID DISPERSION, AND CURED OBJECT OBTAINED THEREFROM

(71) Applicant: DIC Corporation, Tokyo (JP)

(72) Inventors: Naohiro Takeshita, Chiba (JP); Nobuo Kobayashi, Chiba (JP); Yasuko Odani, Chiba (JP); Ena Takeshita, Chiba (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/534,370

(22) PCT Filed: Nov. 12, 2015

(86) PCT No.: PCT/JP2015/081842
§ 371 (c)(1),
(2) Date: Jun. 8, 2017

(87) PCT Pub. No.: WO2016/093014
PCT Pub. Date: Jun. 16, 2016

(65) Prior Publication Data
US 2017/0342234 A1    Nov. 30, 2017

(30) Foreign Application Priority Data
Dec. 12, 2014 (JP) .................. 2014-251925

(51) Int. Cl.
| | |
|---|---|
| C08K 5/07 | (2006.01) |
| C08K 3/22 | (2006.01) |
| C08F 2/44 | (2006.01) |
| G02B 1/04 | (2006.01) |
| C08K 5/5425 | (2006.01) |
| C09C 3/04 | (2006.01) |
| C09C 3/12 | (2006.01) |
| C09C 1/00 | (2006.01) |
| C08F 220/30 | (2006.01) |

(52) U.S. Cl.
CPC .............. *C08K 3/22* (2013.01); *C08F 2/44* (2013.01); *C08F 220/30* (2013.01); *C08K 5/07* (2013.01); *C08K 5/5425* (2013.01); *C09C 1/00* (2013.01); *C09C 3/04* (2013.01); *C09C 3/12* (2013.01); *G02B 1/04* (2013.01); *G02B 1/041* (2013.01); *C08K 2003/2244* (2013.01)

(58) Field of Classification Search
USPC ......... 524/265; 528/271, 272, 273, 274, 279
See application file for complete search history.

(56) References Cited

FOREIGN PATENT DOCUMENTS

| JP | S57-082018 A | 5/1982 |
|---|---|---|
| JP | 2000-159842 A | 6/2000 |
| JP | 2003-105034 A | 4/2003 |
| JP | 2005-185924 A | 7/2005 |
| JP | 2009-221070 A | 10/2009 |
| JP | 2010-189506 A | 9/2010 |
| JP | 2010-254889 A | 11/2010 |

OTHER PUBLICATIONS

Search Report issued in corresponding International Patent Application No. PCT/JP2015/081842, dated Dec. 28, 2015.

*Primary Examiner* — Terressa Boykin
(74) *Attorney, Agent, or Firm* — McDermott Will & Emery LLP

(57) ABSTRACT

Provided are a cured material having a high refractive index for an optical member obtained by preparing a stable dispersion with a small amount of dispersant, and a process for producing dispersion of fine inorganic particles which is capable of drastically shortening the dispersion process time without causing overdispersion under the conditions of high solid concentration and without using media having a small particle size, which are very expensive and for which available dispersing machines are limited. Provided are a process for producing dispersion of fine inorganic particles using a media type wet dispersing machine, which includes supplying the following (A) to (D) to the wet dispersing machine, provided that (D) is supplied last to the wet dispersing machine:
(A) Zirconium oxide nanoparticle,
(B) Silane coupling agent,
(C) Dispersion medium, and
(D) Dispersant;
a curable composition containing a dispersion obtained by the producing process; and a cured material obtained therefrom.

8 Claims, No Drawings

PROCESS FOR PRODUCING DISPERSION OF FINE INORGANIC PARTICLES, CURABLE COMPOSITION CONTAINING SAID DISPERSION, AND CURED OBJECT OBTAINED THEREFROM

CROSS REFERENCE

This application is the U.S. National Phase under 35 U.S.C. § 371 of International Application No. PCT/JP2015/081842, filed on Nov. 12, 2015, which claims the benefit of Japanese Application No. 2014-251925, filed on Dec. 12, 2014, the entire contents of each are hereby incorporated by reference.

TECHNICAL FIELD

The present invention relates to a process for producing dispersion of fine inorganic particles by using a media type wet dispersing machine, a curable composition containing the dispersion of fine inorganic particles, which is obtained by the producing process, and a cured material for an optical member obtained by curing the curable composition.

BACKGROUND ART

In a case of a cured material for an optical member, for example, a prism sheet for enhancing luminance, it is possible to improve front luminance of backlight by increasing the refractive index of a cured resin layer, and in a case of Fresnel lens, it is possible to make the lens pattern shallower as a resin layer has a higher refractive index. Thus, from the aspect that the productivity can be improved by facilitating release from a mold, the high refractive index of the cured resin has been desired.

As a process for producing such a cured material for an optical member, particularly, an optical sheet, a process of utilizing a pressing process, a cutting process, an extrusion process or the like to obtain a prism sheet for liquid crystal improvement, Fresnel lens for Projection TV, Lenticular lens, and the like is proposed (for example, refer to PTL 1).

However, any of the production processes has low productivity, and currently, a process for forming an optical resin layer such as a prism layer and a lens layer on a transparent sheet substrate such as a transparent plastic sheet by using an active energy ray-curable composition has been utilized.

In order to impart high hardness and scratch resistance to such a curable composition, the use of a particle dispersion of inorganic oxides such as silica and zirconia in combination is disclosed (for example, refer to PTL 2).

Further, as a process for obtaining the zirconia particle dispersion, in order to provide a transparent dispersion, a process for performing dispersion with media of 0.05 mm or more using an acetylacetone type dispersion aid is described (for example, refer to PTL 3). It is described that a zirconia particle dispersion having a small dispersed particle size is obtained according to the aforementioned process. However, in a case where the acetyl acetone type dispersion aid is used, there is a disadvantage that deterioration and coloration due to heat and light tend to occur.

A process for producing dispersion of fine inorganic particles, which includes supplying a silane coupling agent last among the respective materials, that is, a zirconium oxide nanoparticle, a dispersant, a dispersion medium, and the silane coupling agent to be supplied to the media type wet dispersing machine, has been proposed (for example, refer to PTL 4). According to the producing process of PTL 4, it is possible to produce a cured material for an optical member which has a high transparency, is stable against heat, and is also excellent in yellowing resistance. However, this process has a problem in that overdispersion occurs when mild dispersion conditions of using media having a small particle diameter of 30 μm or less and lowering the solid concentration at the time of dispersing are not set. The media having a small particle size is very expensive and for which available dispersing machines are limited. In addition, when the media having a small particle size is used and the solid concentration is set to be lowered, the dispersion efficiency is deteriorated, and the process time is significantly prolonged. Another process is to disperse using a large amount of dispersants, but it also includes the problem in that the refractive index of the obtained cured composition is decreased.

A process for mixing and dispersing all of the respective materials, that is, an aggregate of metal oxide nanoparticles, a dispersant, metal alkoxide, and a solvent to be supplied to the dispersing machine before being disintegrated has been proposed (for example, refer to PTL 5). PTL 5 discloses that the amount of dispersant can be reduced so as to solve the problems such as bleed-out and decrease in hardness by the aforementioned production process; however, this process has problems in that the dispersion efficiency is deteriorated, and the process time is significantly prolonged, and the production efficiency is lowered.

CITATION LIST

Patent Literature

[PTL 1] JP-A-57-82018
[PTL 2] JP-A-2003-105034
[PTL 3] JP-A-2005-185924
[PTL 4] JP-A-2010-189506
[PTL 5] JP-A-2009-221070

SUMMARY OF INVENTION

Technical Problem

The present invention was made in consideration of the above described circumstance, and an object of the present invention is to provide a cured material having a high refractive index for an optical member by obtaining a stable dispersion with a small amount of dispersant.

In addition, there is provided a process for producing dispersion of fine inorganic particles which is capable of drastically shortening the dispersion process time without causing overdispersion under the conditions of high solid concentration and without using the media having a small particle size, which are very expensive and for which available dispersing machines are limited.

Solution to Problem

The present inventors diligently made investigations. As a result, the inventors have found that it is possible to solve the above-described problems by supplying a dispersant last at the time of dispersing a zirconium oxide nanoparticle by using a media type wet dispersing machine.

That is, the present invention is to provide a process for producing dispersion of fine inorganic particles using a media type wet dispersing machine, which includes supplying the following (A) to (D) to the wet dispersing machine, provided that (D) is supplied last to the wet dispersing machine.
(A) Zirconium oxide nanoparticle
(B) Silane coupling agent
(C) Dispersion medium
(D) Dispersant Further, the present invention is to provide a curable composition containing the dispersion of fine inorganic particles, which is obtained by the above-described producing process, and a cured material suitable for an optical member obtained by curing the curable composition.

Advantageous Effects of Invention

According to the present invention, when the above-described producing process is provided, it is possible to obtain a cured material having a high refractive index for an optical member by obtaining a stable dispersion with a small amount of dispersant.

In addition, with the above-described process, it is possible to greatly shorten the dispersion process time without causing overdispersion under the conditions of high solid concentration and without using the media having a small particle size, which are very expensive and for which available dispersing machines are limited.

DESCRIPTION OF EMBODIMENTS

Hereinafter, the present invention will be described in detail.

As a media type wet dispersing machine used in the present invention, well-known machines can be used without limitation. For example, as such a dispersing machine, a bead mill (STAR MILL LMZ-015, manufactured by Ashizawa Finetech Ltd., ULTRA APEX MILL UAM-015, manufactured by Kotobuki Industries Co., Ltd. and the like) can be exemplified; however, the media type wet dispersing machine used in the present invention is not limited thereto.

The media used in the present invention are not particularly limited as long as it is generally known beads, and preferable examples thereof include zirconia, alumina, silica, glass, silicon carbide, and silicon nitride. The average particle diameter of the media is preferably in a range of 50 to 500 μm, and is further preferably in a range of 100 to 200 μm. When the particle diameter is 50 μm or more, the impact force against raw material powder is appropriate, and thus dispersion does not require excessive time. On the other hand, when the particle diameter of the media is 500 μm or less, the impact force against raw material powder is appropriate, and thus an increase in the surface energy of the dispersed particles can be suppressed and re-aggregation can be prevented.

In addition, it is possible to shorten the dispersion process time by using two-step process for using media having a large impact force and a large particle diameter at the beginning of pulverization of the raw material powder, and then using media having a small particle diameter which is difficult to re-agglomerate after the particle size of the dispersed particles becomes small.

Further, it is preferable to use a sufficiently polished media from the viewpoint of suppressing the decrease in the light transmittance of the resulting dispersion.

As the zirconium oxide nanoparticles (A) used in the present invention, generally known ones can be used, and the shape of the particle is not particularly limited, but it is, for example, spherical, hollow, porous, rod-like, plate-like, fibrous or amorphous, and the spherical shape is preferable. In addition, the primary particle size is preferably in a range of 1 to 50 nm, and particularly preferably in a range of 1 to 30 nm. A crystal structure is also not particularly limited, but a monoclinic system is preferable.

The silane coupling agent (B) used in the present invention can be exemplified by, but not limited to, the followings.

Examples of a (meth)acryloyloxy-based silane coupling agent include 3-(meth)acryloyloxy propyl trimethyl silane, 3-(meth)acryloyloxy propyl methyl dimethoxy silane, 3-(meth)acryloyloxypropyl trimethoxy silane, 3-(meth) acryloyloxy propyl methyl diethoxy silane, and 3-(meth) acryloyloxy propyl triethoxy silane. Examples of an acryloxy-based silane coupling agent include 3-acryloxypropyl trimethoxy silane.

Examples of a vinyl-based silane coupling agent include allyl trichloro silane, allyl triethoxy silane, allyl trimethoxy silane, diethoxy methyl vinyl silane, trichloro vinyl silane, vinyl trichlorosilane, vinyl trimethoxysilane, vinyl triethoxy silane, and vinyl tris(2-methoxy ethoxy) silane.

Examples of an epoxy-based silane coupling agent include diethoxy (glycidyloxy propyl) methyl silane, 2-(3, 4-epoxy cyclohexyl) ethyl trimethoxy silane, 3-glycidoxy propyl trimethoxy silane, 3-glycidoxy propyl methyl diethoxy silane, and 3-glycidoxy propyl triethoxy silane. Examples of a styrene-based silane coupling agent include p-styryl trimethoxy silane.

Examples of amino-based silane coupling agent include N-2(aminoethyl)3-aminopropyl methyl dimethoxy silane, N-2(aminoethyl)3-aminopropyl trimethoxy silane, N-2 (aminoethyl) 3-aminopropyl triethoxy silane, 3-aminopropyl trimethoxy silane, 3-aminopropyl triethoxy silane, 3-triethoxysilyl-N-(1,3-dimethyl-butylidene)propylamine, and N-phenyl-3-aminopropyl trimethoxy silane.

Examples of a ureidic silane coupling agent include 3-ureidopropyl triethoxy silane. Examples of a chloropropyl-based silane coupling agent include 3-chloropropyl trimethoxy silane. Examples of a mercapto silane coupling agent include 3-mercaptopropyl methyl dimethoxy silane and 3-mercaptopropyl trimethoquin silane. Examples of a sulfide silane coupling agent include bis(triethoxy silyl propyl)tetrasulfide. Examples of an isocyanate-based silane coupling agent include 3-isocyanate propyl triethoxy silane. Examples of an aluminum-based coupling agent include acetoalkoxy aluminum diisopropylate.

Among the above-described silane coupling agents, a (meth)acryloyloxy group, a glycidyl group, and an epoxy cyclohexyl group are preferable, and particularly, a 3-(meth) acryloyloxypropyl trimethoxy silane is most preferable.

The dispersion medium (C) used in the present invention is not particularly limited as long as it disperses the zirconium oxide nanoparticle (A); however, it is preferable that an organic solvent having the viscosity of 200 mPa·s or less at 25° C., a (meth)acrylic monomer, or a (meth)acrylate oligomer is used alone, or these are used in combination.

When the viscosity at 25° C. is 200 mPa·s or less, the viscosity is appropriate at the time of dispersion, and thus it becomes easy to separate the media in the dispersing machine. Note that, the measurement of the viscosity in the present invention can be generally performed by using a well-known process, and examples of a measuring instrument to be used include a B type viscometer.

Preferable examples of the organic solvent include ethanol, isopropanol, butanol, cyclohexanol, methyl ethyl ketone, methyl isobutyl ketone, cyclohexanone, ethyl acetate, propyl acetate, butyl acetate, methyl cellosolve, cellosolve, butyl cellosolve, cellosolve acetate, tetrahydrofuran, 1,4-dioxane, n-hexane, cyclopentane, toluene, xylene, N,N-dimethylformamide, N,N-dimethylacetamide, dichloromethane, trichloroethane, trichloroethylene, and hydrofluoroether.

As the (meth)acrylic monomer, particularly, aromatic ring-containing acrylate such as phenoxyethyl acrylate, phenoxy-2-methylethylacrylate,phenoxyethoxyethylacrylate, 3-phenoxy-2-hydroxypropyl acrylate, 2-phenylphenoxyethyl acrylate, benzyl acrylate, phenyl acrylate, phenyl benzyl acrylate, and paracumyl phenoxyethyl acrylate has a high refractive index, and thus can be preferably used.

In addition, alicyclic skeleton-containing acrylate such as 2-acryloyloxyethyl hexahydrophthalate, cyclohexyl acrylate, dicyclopentanyl acrylate, tetrahydrofurfuryl acrylate, dicyclopentanyl methacrylate, and isobornyl methacrylate has high Abbe number, and thus can be preferably used as an optical material.

Further, monofunctional alkyl (meth)acrylate such as methyl (meth)acrylate, octyl (meth)acrylate, isostearyl (meth)acrylate, hydroxyethyl (meth)acrylate, hydroxyethyl (meth)acrylate, ethylene oxide modified alkyl (meth)acrylate propylene oxide modified alkyl (meth)acrylate, hydroxyethyl (meth)acrylate, and hydroxypropyl (meth) acrylate has low viscosity, and thus can be preferably used.

In addition, bifunctional (meth)acrylate such as (poly) ethylene glycol di(meth)acrylate, (poly)propylene glycol di(meth)acrylate, neopentyl glycol di(meth)acrylate, 1,6-hexanediol di(meth)acrylate, and 1,9-nonanediol di (meth) acrylate, tri- or tetrafunctional (meth)acrylate such as glycerol tri(meth)acrylate, trimethylolpropane tri (meth)acrylate, tri (meth)acrylate phosphate, and pentaerythritol tetra(meth) acrylate, ethylene oxide thereof, and a propylene oxide modified product can improve the hardness of the cured material, and thus can be preferably used.

Even if such a (meth)acrylic monomer is a liquid (meth) acrylic monomer having the viscosity of 200 mPa·s or higher or a solid (meth)acrylic monomer at room temperature, it is possible to be used as a liquid (meth)acrylic monomer having low viscosity or a mixture diluted with an organic solvent by reducing the viscosity to be 200 mPa·s or less.

In addition, as the dispersion medium (C) of the present invention, an epoxy-based monomer can also be used. Particularly, preferable examples thereof include an epoxy compound such as butyl glycidyl ether, ethylene glycol diglycidyl ether, propylene glycol diglycidyl ether, neopentyl glycol diglycidyl ether, and trimethylolpropane triglycidyl ether, and a cyclohexene oxide compound such as 3,4-epoxy cyclohexenyl methyl-3', 4'-epoxy cyclohexene carboxylate, 1,2-epoxy-4-vinylcyclohexane, 1,2:8,9 diepoxy limonene, and 3,4-epoxy cyclohexyl methyl methacrylate.

Examples of the (meth)acrylate oligomer include epoxy (meth)acrylate, and urethane (meth)acrylate.

Examples of epoxy (meth)acrylate include epoxy (meth) acrylate obtained by performing addition reaction of a monomer having a (meth)acryloyl group and a carboxyl group with respect to a compound having an aromatic ring skeleton and an epoxy group in a molecular structure. When the molecular structure has the aromatic ring skeleton, a compound having a high refractive index is realized.

Examples of urethane (meth)acrylate include urethane (meth)acrylate obtained by the reaction between a polyisocyanate compound and a (meth)acrylate compound having one hydroxyl group in the molecular structure, and urethane (meth)acrylate obtained by the reaction between a polyisocyanate compound, a (meth)acrylate compound having one hydroxyl group in the molecular structure, and a polyol compound.

The urethane (meth)acrylate becomes a compound having the high refractive index by introducing an aromatic ring skeleton into the molecular structure. Such a compound can be obtained by using a compound having an aromatic ring skeleton in the molecular structure as any one or both of the polyisocyanate compound and the (meth)acrylate compound having one hydroxyl group in the molecular structure.

Even if such a (meth)acrylate oligomer is a liquid (meth) acrylate oligomer having the viscosity of 200 mPa·s or a solid (meth)acrylate oligomer at room temperature, it is possible to be used as a liquid (meth)acrylic monomer having low viscosity or a mixture diluted with an organic solvent by reducing the viscosity to be 200 mPa·s or less.

In the present invention, in a step of producing a dispersion of fine inorganic particles, a dispersant (D) is supplied to a mixture obtained by sequentially or collectively mixing a zirconium oxide nanoparticle (A), a silane coupling agent (B), and a dispersion medium (C). The order of supplying the above-described (A) to (C) to the dispersing machine is not particularly limited.

The dispersant (D) is not particularly limited as long as it is a compound containing a group having affinity with the zirconium oxide nanoparticle (A); however, examples of the preferable dispersant include an anionic dispersant having an acid group such as a carboxylic acid, a sulfuric acid, a sulfonic acid or a phosphoric acid, or a salt thereof. Among them, a phosphoric acid ester-based dispersant is preferable. The amount of the dispersant (D) to be used is not particularly limited; however, it is in a range of 0.1% to 30% by mass, and is preferably in a range of 0.5% to 15% by mass, with respect to the zirconium oxide nanoparticles (A), and it is possible to obtain a dispersion having good stability even if the amount is smaller than the amount of the dispersant conventionally required.

Further, in the obtained dispersion, a proportion of the total mass of the zirconium oxide nanoparticle (A) and the dispersant (D) is preferably 20% by mass or more from the aspect it has good handling at the time of producing a curable composition to be described later, can shorten the dispersion process time, and is excellent in the stability of the dispersion. Particularly, the proportion is preferably adjusted to be in a range of 25% by mass to 35% by mass.

The curable composition of the present invention contains the dispersion of fine inorganic particles obtained by the producing process of the present invention.

The curable composition of the present invention contains the dispersion of fine inorganic particles obtained by the present invention, and may further contain a resin which may have a reactive group, a filler, a solvent, a photopolymerization initiator, a sensitizer, a polymerization initiator, an epoxy curing agent and a curing accelerator, a leveling agent, an adhesion aid, a releasing agent, a lubricant, an ultraviolet absorber, an antioxidant, and a heat stabilizer.

The curable composition of the present invention can be cured by heat or an active energy ray. The active energy ray is not particularly limited as long as it is an active energy ray with which the curable composition of the present invention is cured, and particularly, it is preferable to use ultraviolet rays.

Examples of a source of the ultraviolet rays include a fluorescent chemical lamp, black light, a low-pressure, high-pressure, and extra-high pressure mercury lamp, a metal halide lamp, and sunlight. The irradiation intensity of ultraviolet rays may be a constant intensity throughout the entire period, or the physical properties after curing can be fine-adjusted by changing the intensity during curing.

As an active energy ray other than ultraviolet rays, for example, a visible ray and an active energy ray of electron beams can be also used. The curable composition of the present invention can have unique spectral sensitivity in a range of 200 to 400 nm, and have an energy having a typically used energy ray such as an energy value of 20 m W/cm$^2$ in the absence of the photopolymerization initiator; however, there is no limitation.

The curable composition of the present invention is cured by irradiation with the ultraviolet rays or the visible rays in the absence of the photopolymerization initiator, and also it can be cured by adding various photopolymerization initiators thereto in order to more efficiently perform the curing reaction. The photopolymerization initiator can be roughly divided into two types, an intramolecular bond cleavage type and an intramolecular hydrogen abstraction type.

Examples of the intramolecular bond cleavage type photopolymerization initiator include acetophenones such as diethoxy acetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy) phenyl-(2-hydroxy-2-propyl) ketone, 1-hydroxycyclohexyl-phenyl ketone, 2-methyl-2-morpholino (4-thiomethyl phenyl) propan-1-one, and 2-benzyl-2-dimethylamino-1-(4-morpholinophenyl)-butanone; benzoins such as benzoin, benzoin methyl ether, and benzoin isopropyl ether; acyl phosphine oxides such as 2,4,6-trimethyl benzoin diphenyl phosphine oxide; benzyl, and methyl phenylglyoxy ester.

On the other hand, examples of the intramolecular hydrogen abstraction type photopolymerization initiator include benzophenones such as benzophenone, o-benzoyl benzoic acid methyl ester-4-phenyl benzophenone, 4,4'-dichlorobenzophenone, hydroxy benzophenone, 4-benzoyl-4'-methyl-diphenyl sulfide, acrylated benzophenone, 3,3',4,4'-tetra(t-butyl peroxycarbonyl) benzophenone, and 3,3'-dimethyl-4-methoxy benzophenone; thioxanthones such as 2-isopropyl thioxanthone, 2,4-dimethyl thioxanthone, 2,4-diethyl thioxanthone, and 2,4-dichlorothioxanthone;

aminobenzophenones such as Michler's ketone, and 4,4'-diethyl aminobenzophenone; 10-butyl-2-chloroacridone, 2-ethylanthraquinone, 9,10-phenanthrenequinone, and camphorquinone.

In a case of using the photopolymerization initiators, the content used in the curable composition is preferably in a range of 0.01 to 10% by mass.

In addition, in the curable composition of the present invention, a photosensitizer can be used in combination in order to more efficiently perform the curing reaction. Examples of such a photosensitizer include amines such as triethanol amine, methyl diethanol amine, triisopropanol amine, 4-dimethyl aminobenzoic acid methyl ester, 4-dimethyl aminobenzoic acid ethyl ester, 4-dimethyl aminobenzoic acid isoamyl ester, benzoic acid(2-dimethylamino) ethyl ester, 4-dimethyl aminobenzoic acid(n-butoxy) ethyl ester, and 4-dimethyl aminobenzoic acid 2-ethyl hexyl ester.

In a case of using the photosensitizer, the content used in the curable composition is preferably in a range of 0.01 to 10% by mass. Further, in the curable composition of the present invention, depending on the purpose, a nonreactive compound, an inorganic filler, an organic filler, a coupling agent, a tackifier, an antifoaming agent, a leveling agent, a plasticizer, an antioxidant, an ultraviolet absorber, a flame retardant, a pigment, a dye, and the like can be properly used in combination.

The cured material obtained in the present invention can be preferably used as an optical member for an anti-reflection film such as a plastic lens, a film for enhancing luminance (prism sheet), a film type liquid crystal element, a touch panel, and a plastic optical part, for example.

EXAMPLES

Hereinafter, the present invention will be described with reference to Examples and Comparative Examples.

Example 1

166.5 g of zirconium oxide nanoparticle powders (Product name: UEP-100, produced by Daiichi Kigenso Kagaku Kogyo Co., Ltd., primary particle size of 11 nm), 25.0 g of 3-(meth)acryloyloxypropyl trimethoxy silane (Product name: KBM-503, produced by Shin-Etsu Chemical Co., Ltd.), and 415.5 g of methyl ethyl ketone (hereinafter, referred to as MEK) were mixed, and stirred for 30 minutes by using a dispersion stirrer so as to perform coarse dispersion. The obtained mixed solution was subjected to a dispersion treatment with zirconia beads having a particle size of 100 μm by using a STAR MILL LMZ-015 (manufactured by Ashizawa Finetech Ltd.) which is a media type wet dispersing machine. After performing the dispersion treatment for 100 minutes of residence time while confirming the particle size during the treatment, 17.5 g of dispersant (Product name: DISPERBYK-111, produced by BYK-Chemie Japan K.K, phosphate ester compound) was added and mixed thereto, and the mixture was further subjected to the dispersion treatment for 20 minutes, thereby obtaining a dispersion of Example 1. Note that, the particle size of the sample in the absence of the dispersant was measured after a specified amount of dispersant was added and stirred.

Example 2

A dispersion treatment was performed under the same conditions as those in Example 1 except that the dispersant of Example 1 was changed to 16.7 g of DISPARLON PW-36 (produced by Kusumoto Chemicals, Ltd, phosphate ester compound).

Example 3

A dispersion treatment was performed under the same conditions as those in Example 1 except that the amount of each of the silane coupling agent and the dispersant of Example 1 was changed to 33.3 g and 26.2 g, respectively.

Comparative Example 1

166.5 g of zirconium oxide nanoparticle powders (Product name: UEP-100, produced by Daiichi Kigenso Kagaku Kogyo Co., Ltd., primary particle size of 11 nm), 25.0 g of 3-(meth)acryloyloxypropyl trimethoxy silane (Product name: KBM-503, produced by Shin-Etsu Chemical Co., Ltd.), 17.5 g of dispersant (Product name: DISPERBYK-111 produced by BYK-Chemie Japan K.K), and 415.5 g of MEK were mixed, stirred for 30 minutes by using a dispersion stirrer so as to perform coarse dispersion. The obtained mixed solution was subjected to a dispersion treatment with zirconia beads having a particle size of 100 μm by using a STAR MILL LMZ-015 (manufactured by Ashizawa Finetech Ltd.) which is a media type wet dispersing machine. The dispersion treatment proceeded while confirming the particle size during the treatment. As a result, the particle size after 200 minutes of treatment was increased and overdispersion occurred.

Comparative Example 2

A dispersion treatment was performed under the same conditions as those in Comparative Example 1 except that the amount of each of the silane coupling agent and the dispersant of Comparative Example 1 was changed to 33.3 g and 26.2 g, respectively. A dispersion of Comparative Example 2 was obtained by the dispersion treatment for 400 minutes of residence time.

Comparative Example 3

166.5 g of zirconium oxide nanoparticle powders (Product name: UEP-100, produced by Daiichi Kigenso Kagaku Kogyo Co., Ltd., primary particle size of 11 nm), 17.5 g of dispersant (Product name: DISPERBYK-111 produced by BYK-Chemie Japan K.K), and 415.5 g of MEK were mixed, stirred for 30 minutes by using a dispersion stirrer so as to perform coarse dispersion. The obtained mixed solution was subjected to a dispersion treatment with zirconia beads having a particle size of 100 μm by using a STAR MILL LMZ-015 (manufactured by Ashizawa Finetech Ltd.) which is a media type wet dispersing machine. 25.0 g of 3-(meth) acryloyloxypropyl trimethoxy silane (Product name: KBM-503, produced by Shin-Etsu Chemical Co., Ltd.) was added and mixed at a constant rate for 60 minutes immediately after starting the dispersion treatment, and the dispersion treatment was continued. The dispersion treatment proceeded while confirming the particle size during the treatment. As a result, the particle size after 250 minutes of treatment was increased and overdispersion occurred.

Measurement Example

<Measurement of Dispersed Particle Size of Zirconium Oxide Nanoparticle in Dispersion>

The dispersed particle size of the zirconium oxide nanoparticle in the dispersion one day after preparation (stored at 25° C.) was measured at 25° C. by using a particle size distribution measuring device, ELSZ-1000, manufactured by Otsuka Electronics Co., Ltd. The zirconium oxide was diluted such that the concentration thereof became 0.1% by mass by using the dispersion medium equivalent to that contained in the dispersion, and then a median diameter was measured on a volume basis.

Note 1) zirconium oxide nanoparticle: UEP-100
Note 2) DISPARLON PW-36 (Product name, produced by Kusumoto Chemicals, Ltd,)
Note 3) DISPERBYK-111 (Product name, produced by BYK-Chemie Japan K.K)
Note 4) KBM-503 (Product name, produced by Shin-Etsu Chemical Co., Ltd.)

TABLE 1

| | | Examples and Comparative Examples | | | | | |
|---|---|---|---|---|---|---|---|
| | | Example 1 | Example 2 | Example 3 | Comparative Example 1 | Comparative Example 2 | Comparative Example 3 |
| Solid concentration (%) | | 29.5 | 29.4 | 30.0 | 29.5 | 30.0 | 29.5 |
| Particle size (nm) | 0 min | 986 | 979 | 861 | 914 | 803 | 962 |
| | 50 min | 65 | 64 | 50 | 316 | 111 | 543 |
| | 75 min | 55 | 54 | 45 | 232 | 88 | 305 |
| | 100 min | 41 | 41 | 39 | 185 | 75 | 219 |
| | 150 min | — | — | — | 190 | 68 | 193 |
| | 200 min | — | — | — | 226 | 61 | 197 |
| | 250 min | — | — | — | — | 55 | 213 |
| | 300 min | — | — | — | — | 48 | — |
| | 400 min | — | — | — | — | 42 | — |
| Dispersion time (min) | | 120 | 120 | 120 | 200 | 400 | 250 |
| Particle size at last | | 41 | 41 | 39 | 206 | 42 | 213 |
| Dispersion state | | Excellent | Excellent | Excellent | Overdispersion | Excellent | Overdispersion |

Example 4

Producing of Curable Composition (1)

4.7 parts by mass of fluorine acrylate (Product name: OGSOL EA-0200, produced by Osaka Gas Chemicals Co., Ltd.) and 20.5 parts by mass of 2-phenyl phenoxyacrylate (Product name: M1142, produced by Mi Won Specialty Chemical) were added as a UV monomer to 93.7 parts by mass of zirconium oxide dispersion produced in Example 1, and a volatile component was removed under the reduced pressure with an evaporator. 1.6 parts by mass of 2,4,6-trimethyl benzoyl phenyl phosphine oxide (LUCIRIN TPO, produced by BASF) and 0.5 parts by mass of 1-hydroxycyclohexyl-phenyl ketone (Product name: IRGACURE 184, produced by BASF) were added as a photopolymerization initiator, to the obtained composition so as to produce an optical curable composition (1).

Example 5

Producing of Curable Composition (2)

An optical curable composition (2) was produced with 93.6 parts by mass of zirconium oxide dispersion produced in Example 2 by using the same process as that used in Example 4.

Example 6

Producing of Curable Composition (3)

An optical curable composition (3) was produced with 96.3 parts by mass of zirconium oxide dispersion produced in Example 3 by using the same process as that used in Example 4.

Comparative Example 4

Producing of Curable Composition (4)

An optical curable composition (4) was produced with 96.3 parts by mass of zirconium oxide dispersion produced in Comparative Example 2 by using the same process as that used in Example 4.

Example 7

Producing of Cured Material (1)

The optical curable composition (1) obtained in Example 4 was applied to a glass substrate by using an applicator, and then the coated film was photo-cured in the atmosphere at 1000 mJ/cm$^2$ with a 120 W/cm of high pressure mercury lamp so as to obtain a cured film (1) having a thickness of approximately 100 μm.

Examples 8 and 9

Similar to Example 7, cured films (2) and (3) were obtained by using the optical curable compositions (2) and (3) obtained in Examples 5 and 6.

Comparative Example 5

Similar to Example 7, a cured film (4) was obtained by using the optical curable composition (4) obtained in Comparative Example 4.

Method of Measuring Refractive Index and Transparency of Cured Material

Regarding the obtained cured material (cured film), the refractive index was measured with an Abbe refractometer and the transparency was measured with a Haze meter. The results are indicated in Table 2.

TABLE 2

| Cured film | Curable composition | Dispersion | Refractive index | Haze value | Total light transmittance (%) |
|---|---|---|---|---|---|
| Cured film (1) Example 7 | Example 4 | Example 1 | 1.639 | 2.7 | 90% |
| Cured film (2) Example 8 | Example 5 | Example 2 | 1.638 | 2.7 | 90% |
| Cured film (3) Example 9 | Example 6 | Example 3 | 1.630 | 2.8 | 89% |
| Cured film (4) Comparative Example 5 | Comparative Example 4 | Comparative Example 2 | 1.630 | 2.8 | 89% |

INDUSTRIAL APPLICABILITY

The dispersion of fine inorganic particles obtained by the producing process of the present invention can be used for a cured material having high refractive index by heat or ultraviolet irradiation, and the cured material can be suitably used as an optical member.

The invention claimed is:

1. A process for producing a dispersion of fine inorganic particles using a media type wet dispersing machine, the process comprising:
    supplying a first material containing the following (A) to (C) to the wet dispersing machine to perform a first dispersion treatment on the first material; and
    after the first dispersion treatment, adding a second material containing the following (D) to the dispersed first material in the wet dispersing machine to perform a second dispersion treatment on the dispersed first material and the second material,
    (A) zirconium oxide nanoparticle,
    (B) silane coupling agent having a (meth)acryloyloxy group, a glycidyl group, or an epoxy cyclohexyl group,
    (C) dispersion medium, and
    (D) anionic dispersant having an acid group which is a phosphoric acid, a carboxylic acid, a sulfuric acid or a sulfonic acid, or a salt thereof.

2. The process for producing dispersion of fine inorganic particles according to claim 1, wherein a proportion of the total mass of the zirconium oxide nanoparticle (A) and the dispersant (D) is 20% by mass or more in the dispersion.

3. The process for producing dispersion of fine inorganic particles according to claim 1, wherein an average particle diameter of the media used is in a range of 50 to 500 μm.

4. The process for producing dispersion of fine inorganic particles according to claim 1, wherein the dispersion medium (C) has a viscosity of 200 Pa·s or less at 25° C.

5. The process for producing dispersion of fine inorganic particles according to claim 1, wherein the dispersion medium (C) is one or more compounds selected from the group consisting of an organic solvent, a (meth)acrylic monomer, an epoxy-based monomer, and a (meth)acrylate oligomer.

6. The process for producing dispersion of fine inorganic particles according to claim 1, wherein the silane coupling agent (B) is 3-(meth)acryloyloxypropyl trimethoxy silane, 3-acryloxypropyl trimethoxy silane, vinyl trimethoxy silane, vinyl triethoxy silane, p-styryl trimethoxy silane, or 3-mercaptopropyl methyl dimethoxy silane.

7. A method of producing a curable composition comprising a dispersion of fine inorganic particles, the method comprising obtaining the dispersion of fine inorganic particles by the process according to claim 1.

8. A method of producing a cured material for an optical member, the method comprising curing the curable composition according to claim 7.

* * * * *